(12) United States Patent
Niu (10) Patent No.: US 12,401,447 B2
(45) Date of Patent: Aug. 26, 2025

(54) ERROR VECTOR MAGNITUDE MEASUREMENT METHOD, TRANSMITTER AND COMPUTER- READABLE STORAGE MEDIUM

(71) Applicant: ZTE CORPORATION, Shenzhen (CN)

(72) Inventor: Kun Niu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/565,276

(22) PCT Filed: May 23, 2022

(86) PCT No.: PCT/CN2022/094468
§ 371 (c)(1),
(2) Date: Nov. 29, 2023

(87) PCT Pub. No.: WO2022/267789
PCT Pub. Date: Dec. 29, 2022

(65) Prior Publication Data
US 2024/0364444 A1 Oct. 31, 2024

(30) Foreign Application Priority Data
Jun. 21, 2021 (CN) .......................... 202110687579.3

(51) Int. Cl.
*H04L 1/00* (2006.01)
*H04B 17/17* (2015.01)

(52) U.S. Cl.
CPC ........... *H04L 1/0003* (2013.01); *H04B 17/17* (2015.01); *H04L 1/0026* (2013.01)

(58) Field of Classification Search
None
See application file for complete search history.

(56) References Cited

U.S. PATENT DOCUMENTS 10,256,924 B1    4/2019  Menzel
2003/0086515 A1*  5/2003  Trans .................... H04L 1/0054
                                                         375/346
(Continued)

FOREIGN PATENT DOCUMENTS

CN         101499861 A      8/2009
CN         101925103 A     12/2010
(Continued)

OTHER PUBLICATIONS

J. Lei, D. Gang and Z. Ping, "EVM Measurement Algorithm for OFDM Transmitters," 2006 International Symposium on Communications and Information Technologies, Bangkok, Thailand, 2006, pp. 102-107, (Year: 2006).*
(Continued)

*Primary Examiner* — Daniel F. McMahon
(74) *Attorney, Agent, or Firm* — Vivacqua Crane, PLLC (57) ABSTRACT

Disclosed are an Error Vector Magnitude (EVM) measurement method, a transmitter, and a computer-readable storage medium. The EVM measurement method includes: acquiring a cell configuration parameter from a control terminal device; generating a test data source according to the cell configuration parameter; obtaining a measurement signal according to the test data source; determining an error vector magnitude according to the measurement signal and a preset reference signal; and sending the error vector magnitude to the control terminal device, wherein the control terminal device determines whether there is any abnormality in RF indicators of the transmitter according to the error vector magnitude.

8 Claims, 8 Drawing Sheets

(56) References Cited

U.S. PATENT DOCUMENTS

| | | | | |
|---|---|---|---|---|
| 2012/0207248 A1* | 8/2012 | Ahmed | ............... | H03M 1/1255 |
| | | | | 375/340 |
| 2013/0084852 A1 | 4/2013 | Duperray | | |
| 2020/0028639 A1* | 1/2020 | Lindqvist | ................ | H04L 5/006 |
| 2023/0163813 A1* | 5/2023 | Frank | ................... | H04B 7/0413 |
| | | | | 375/267 |
| 2023/0198817 A1* | 6/2023 | Frank | ................... | H04B 7/0413 |
| | | | | 375/232 |

FOREIGN PATENT DOCUMENTS

| | | |
|---|---|---|
| CN | 103346850 A | 10/2013 |
| CN | 106332157 A | 1/2017 |
| CN | 110120843 A | 8/2019 |
| JP | 2010157866 A | 7/2010 |

OTHER PUBLICATIONS

European Patent Office. Extended European Search Report for EP Application No. 22827286.0, mailed Sep. 27, 2024, pp. 1-50.

International Searching Authority. International Search Report and Written Opinion for PCT Application No. PCT/CN2022/094468 and English translation, mailed Jul. 27, 2022, pp. 1-10.

Industrial Property Cooperation Center (IPCC). Search Report for JP Application No. 2023-574827 and English translation, mailed Nov. 8, 2024, pp. 1-32.

Japan Patent Office. Notice of Reasons for Refusal for JP Application No. 2023-574827 and English translation, mailed Nov. 25, 2024, pp. 1-6.

\* cited by examiner

FIG. 12 ized, and an attenuator, and a spectrometer and the like are usually connected to each other to test the RF indicators of the AAU/RRU transmitter. However, a test environment is relatively complex, and when there are problems in the test, it is difficult to locate the problems due to the large number of modules, so that the equipment always needs to be removed and returned to the repair center or laboratory for retest to locate the problems, which is very troublesome.

ERROR VECTOR MAGNITUDE MEASUREMENT METHOD, TRANSMITTER AND COMPUTER- READABLE STORAGE MEDIUM

CROSS-REFERENCE TO RELATED APPLICATION

This application is a national stage filing under 35 U.S.C. § 371 of international application number PCT/CN2022/094468, filed May 23, 2022, which claims priority to Chinese patent application No. 202110687579.3, filed Jun. 21, 2021. The contents of these applications are incorporated herein by reference in their entirety.

TECHNICAL FIELD

The present disclosure relates to the field of mobile communication, and more particularly, to an EVM measurement method, a transmitter, and a computer-readable storage medium.

BACKGROUND

When testing the radio frequency (RF) indicators of an Active Antenna Unit (AAU) or a Remote Radio Unit (RRU) transmitter, Error Vector Magnitude (EVM) is usually used as a standard to measure magnitude error and phase error of a signal. In some cases, multiple modules such as a Base Band Unit (BBU), an AAU/RRU, an attenuator, and a spectrometer and the like are usually connected to each other to test the RF indicators of the AAU/RRU transmitter. However, a test environment is relatively complex, and when there are problems in the test, it is difficult to locate the problems due to the large number of modules, so that the equipment always needs to be removed and returned to the repair center or laboratory for retest to locate the problems, which is very troublesome.

SUMMARY

The following is a summary of the subject matter set forth in the description. This summary is not intended to limit the scope of protection of the claims.

Embodiments of the present disclosure provide an EVM measurement method, a transmitter, and a computer-readable storage medium.

In accordance with a first aspect of the present disclosure, an embodiment provides an EVM measurement method, which is applied to a transmitter. The method includes: acquiring a cell configuration parameter from a control terminal device; generating a test data source according to the cell configuration parameter; obtaining a measurement signal according to the test data source; determining an error vector magnitude according to the measurement signal and a preset reference signal; and sending the error vector magnitude to the control terminal device, such that the control terminal device performs problem locating on the transmitter according to the error vector magnitude.

In accordance with a second aspect of the present disclosure, an embodiment provides an EVM measurement apparatus, which includes: an information acquisition module, configured to acquire a cell configuration parameter from a control terminal device; a generation module, configured to generate a test data source according to the cell configuration parameter; a processing module, configured to obtain a measurement signal according to the test data source; a test module, configured to determine an error vector magnitude according to the measurement signal and a preset reference signal; and a transmission module, configured to transmit the error vector magnitude to the control terminal device, such that the control terminal device performs problem locating on a transmitter according to the error vector magnitude.

In accordance with a third aspect of the present disclosure, an embodiment provides a transmitter, which includes: a memory, a processor, a program stored in the memory and capable of running on the processor, and a data bus for implementing connection and communication between the processor and the memory. The program, when executed by the processor, causes the processor to implement the EVM measurement method in accordance with the first aspect.

In accordance with a fourth aspect of the present disclosure, an embodiment provides a base station, which includes: a memory, a processor, and a computer program stored in the memory and capable of running on the processor, where the computer program, when executed by the processor, causes the processor to implement the EVM measurement method in accordance with the first aspect.

In accordance with a fifth aspect of the present disclosure, an embodiment provides a computer-readable storage medium, storing one or more programs executable by one or more processors which, when executed by the one or more processors, cause the one or more processors to implement the EVM measurement method in accordance with the first aspect.

Additional features and advantages of the present disclosure will be set forth in the description which follows, and will be in part obvious from the description, or may be learned by the practice of the present disclosure. The objects and other advantages of the present disclosure can be realized and obtained by the structures particularly pointed out in the description, claims, and accompanying drawings.

DETAILED DESCRIPTION

To make the objects, technical schemes, and advantages of the present disclosure clear, the present disclosure is described in further detail in conjunction with the accompanying drawings and examples. It should be understood that the specific embodiments described herein are merely used for illustrating the present disclosure, and are not intended to limit the present disclosure.

It is to be noted, although functional modules have been divided in the schematic diagrams of system and logical orders have been shown in the flowcharts, in some cases, the modules may be divided in a different manner in the apparatus, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides an EVM measurement method and apparatus, a transmitter, a base station, and a computer-readable storage medium. According to the present disclosure, a cell configuration parameter is first acquired from a control terminal device; then, a test data source is generated according to the cell configuration parameter; further then, a measurement signal is obtained according to the test data source; and finally, an error vector magnitude is determined according to the measurement signal and a preset reference signal, and the error vector magnitude is sent to the control terminal device, such that the control terminal device determines whether the transmitter is abnormal according to the error vector magnitude. Therefore, when detecting the RF indicators of the transmitter, whether there are any abnormalities in the RF indicators of the transmitter can be detected without removing and returning the transmitter to the factory, thus saving a lot of costs.

The embodiments of the present disclosure will be further described in detail below in conjunction with the accompanying drawings.

Figure 1:
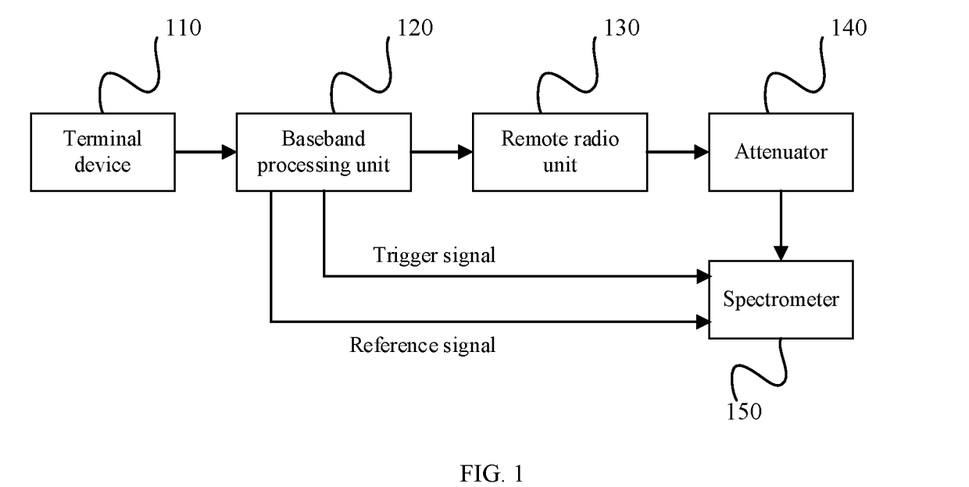
FIG. 1 is a module block diagram of EVM measurement in some scenarios.
Figure 2:
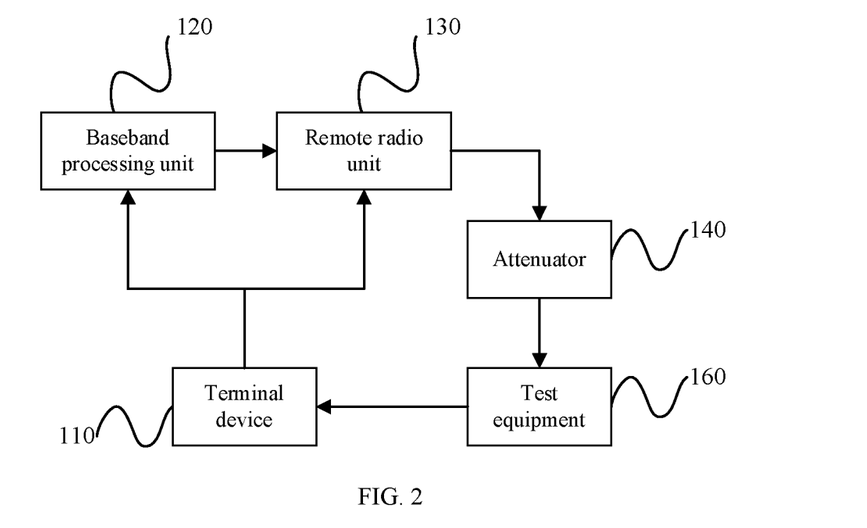
FIG. 2 is another module block diagram of EVM measurement in some scenarios.

As shown in FIG. 1 and FIG. 2, FIG. 1 is a module block diagram of EVM measurement in some scenarios, and FIG. 2 is another module block diagram of EVM measurement in some scenarios. When testing the RF indicators of an AAU or RRU transmitter, EVM is usually used as an important parameter to comprehensively measure the magnitude error and the phase error of a signal. It can be understood that in some cases, a test apparatus is provided, including a terminal device 110, a baseband processing unit 120, a RRU 130, an attenuator 140, and a spectrometer 150 (or test equipment 160). The terminal device 110 controls the baseband processing unit 120 to deliver test data, and the baseband processing unit 120 transmits the test data to the RRU 130 via optical fibers for processing. The test data processed cannot be directly transmitted to the spectrometer because of excessive power, and thus needs to be attenuated by the attenuator 140 before being transmitted to the spectrometer 150. At the same time, the baseband processing unit 120 needs to send a trigger signal and a reference signal to the spectrometer 150, and the spectrometer 150 calculates and obtains the EVM according to the trigger signal, the reference signal, and the attenuated measurement signal. When the test equipment 160 as shown in FIG. 2, which cannot directly display a calculation result, is used, the result may need to be sent to the terminal device 110 for presentation after the test equipment 160 measures the EVM. Due to the complexity of the test environment and the large number of modules, it is not possible to quickly determine which module has a problem when the calculated EVM is abnormal. Therefore, the transmitter may need to be removed from the station, transported to the repair center or laboratory, and connected to the spectrometer 150 for retest to determine which module has a problem. Such a test method has low efficiency in problem locating and high cost.

Figure 3:
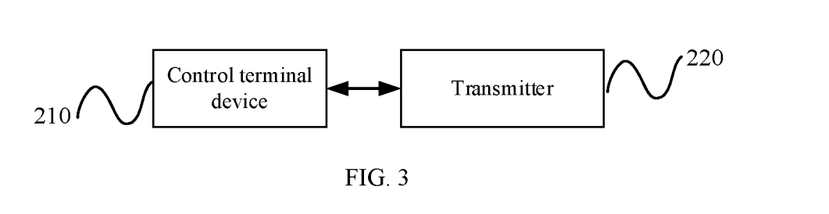
FIG. 3 is a block diagram of a test environment according to an embodiment of the present disclosure.

In view of the above, an embodiment of the present disclosure provides a test environment as shown in FIG. 3. FIG. 3 is a block diagram of a test environment according to an embodiment of the present disclosure. It can be understood that in this embodiment, there is no need to build a complex test environment, and the EVM measurement of RF channels of a transmitter 220 can be completed by connecting the transmitter 220 to a control terminal device 210. The transmitter 220 can generate and deliver a test data source by itself, without controlling the baseband processing unit to generate and deliver the data source via optical fibers for measurement. The transmitter 220 in this embodiment can loop back the test data source via a coupling channel for collection and demodulation, and finally obtain the error vector magnitude of the channel, without having to attenuate the test data by the attenuator and transmit the attenuated data to the spectrometer connected to the attenuator for measurement. Compared with some test environments in certain situations, the test environment in this embodiment is simple, which reduces the test cost and complexity. Meanwhile, because the transmitter 220 can deliver the test data source by itself and loop back the test data source for demodulation, the test efficiency is also greatly improved. In addition, in case of traffic test, field test and other scenarios, when a channel of the transmitter 220 is suspected to be abnormal, the test environment in this embodiment can be used to determine whether there is any abnormality in the RF indicators of the transmitter 220, without removing and returning the transmitter 220 to the factory for detection, thus improving the efficiency of problem locating.

Figure 4:
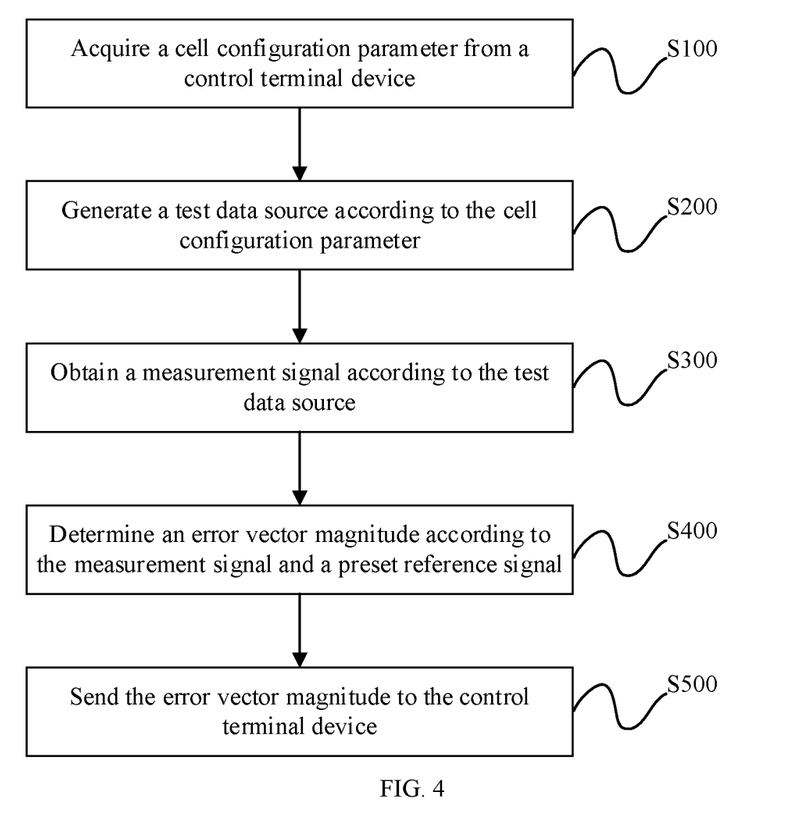
FIG. 4 is a flowchart of an EVM measurement method according to an embodiment of the present disclosure.

As shown in FIG. 4, an embodiment of the present disclosure provides an EVM measurement method. It can be understood that the EVM measurement method is applied to a transmitter. The EVM measurement method includes, but not limited to, the following steps S100, S200, S300, S400, and S500.

At S100, a cell configuration parameter is acquired from a control terminal device.

It can be understood that a cell configuration parameter is preset in the control terminal device mentioned in this embodiment, and when EVM needs to be measured, the transmitter receives the cell configuration parameter from the control terminal device. The cell configuration parameter includes information such as signal system and bandwidth. The transmitter can generate a test data source by itself according to the cell configuration parameter.

At S200, a test data source is generated according to the cell configuration parameter.

It can be understood that in the signal system within the cell configuration parameter, it is specifically mentioned whether the cell belongs to a 4G network or a 5G network. In TS38.141 protocol 4.9.2 of 3rd Generation Partnership Project (3GPP), the 5G New Radio (5G NR) test model required by the test of the RF indicators of AAU/RRU is specified, and in TS36.141 protocol 6.1.1 of 3GPP, the Long Term Evolution (LTE) test model required by the test of the RF indicators is specified. As shown in Table 1 and Table 2 below, different test models correspond to different Resource Block (RB) numbers and modulation modes, and different test models correspond to different test data sources. In this embodiment, the transmitter can generate corresponding test data sources according to the test models defined in the TS38.141 protocol and the TS36.141 protocol, and deliver the test data sources for measurement.

TABLE 1

EVM test data source for NR signal specified in TS38.141 protocol

| Test models | RB numbers | Modulation modes |
| --- | --- | --- |
| TM2 | 1 RB | 64 QAM |
| TM2a | 1 RB | 256 QAM |
| TM3.1 | Full RB | 64 QAM |
| TM3.1a | Full RB | 256 QAM |
| TM3.2 | Full RB | 16 QAM |
| TM3.3 | Full RB | QPSK |

EVM test data source for LTE signal specified in TS36.141 protocol

| Test models | RB numbers | Modulation modes |
| --- | --- | --- |
| TM2 | 1 RB | 64 QAM |
| TM2a | 1 RB | 256 QAM |
| TM3.1 | Full RB | 64 QAM |
| TM3.1a | Full RB | 256 QAM |
| TM3.2 | Full RB | 16 QAM |
| TM3.3 | Full RB | QPSK |

It should be noted that when the signal system in the cell configuration parameter is 5G NR and the specified test model is TM2, the transmitter acquires the cell configuration parameter and determines that the test model is TM2, with a corresponding RB number of 1 and a modulation mode of 64 QAM. At the same time, the transmitter also determines the bandwidth and other information corresponding to the test model. Then, the transmitter generates a test data source according to the information, and delivers the test data source for measurement. Compared with the method for generating a test data source by controlling a baseband processing unit through a terminal device in some cases, the transmitter in this embodiment can generate a test data source by itself after acquiring a cell configuration parameter and deliver the test data source for detection, saving a lot of costs.

At S300, a measurement signal is obtained according to the test data source.

It can be understood that after the transmitter generates and delivers the test data source, the test data source is subjected to various processing within the transmitter, including but not limited to, power amplification, coupling, and screening. After the test data source is processed, a measurement signal that meets the requirements of the test model can be obtained and used as a basic parameter for calculating EVM.

At S400, an error vector magnitude is determined according to the measurement signal and a preset reference signal.

It can be understood that a plurality of reference signals are preset in the transmitter, and the plurality of reference signals respectively correspond to the test models in the cell configuration parameter. In the 3GPP protocols, specific reference signals are set for different test models, that is, each test model has a corresponding reference signal. The reference signal refers to a signal obtained the test data source is subjected to the above processing in an ideal state. Compared with the measurement signal obtained by processing the test data source in an actual situation, the reference signal is a signal obtained through undistorted transmission, that is, only the magnitude and the time of appearance of the signal are different, and there is no change in the waveform. At this time, according to the reference signal in the ideal state and the measurement signal obtained in the actual situation, the EVM can be calculated, to obtain an error between the measurement signal and the reference signal, and then whether there is any abnormality in the RF indicators of the transmitter can be determined.

At S500, the error vector magnitude is sent to the control terminal device.

It can be understood that since the process of calculation of EVM is completed within the transmitter, the error vector magnitude may need to be sent to the control terminal device after completion of the calculation, such that the control terminal device can perform problem locating according to the error vector magnitude and determine whether the RF indicators of the transmitter are normal.

It can be understood that the control terminal device proposed in this embodiment includes, but not limited to, a personal computer (PC). The PC is connected to the transmitter, and sends the cell configuration parameter to the transmitter when detecting the RF channel indicators of the transmitter. The transmitter then generates a data source according to the cell configuration parameter and processes the data source. Finally, the error vector magnitude is obtained by performing demodulation and calculation on the data source, and then the result is sent to the PC for presentation, so as to judge whether the RF indicators of the transmitter are normal according to a detection result of the PC. Therefore, the transmitter does not have to be removed and returned to the factory for inspection, thus improving the efficiency of problem locating.

It should be noted that, according to the EVM measurement method proposed in this embodiment, the test of the error vector magnitude in the RF channel of the transmitter can be completed by connecting the transmitter to the control terminal device, without building a complex test environment. In some cases in the existing technology, the baseband processing unit generates the test data source, and a signal output by the RRU after processing of the data source has a high output power and needs to be attenuated by the attenuator to be converted into a signal with a power suitable for the spectrometer. In this embodiment, the transmitter can loop back the test data source via a coupling channel, and perform collection and demodulation on the test data source to calculate the error vector magnitude of the channel, without having to attenuate the test data by the attenuator and transmit the attenuated test data to the spectrometer connected to the attenuator for EVM measurement. When a peak traffic cannot be reached, the EVM measurement method in this embodiment can decouple the measurement signal and locate the problem, and determine whether downlink RF indicators of the transmitter are normal, without removing and returning the transmitter to the repair center or laboratory for retest and problem locating, thus saving the test costs.

In addition, because the transmitter can generate the test data source by itself and loop back the test data source for demodulation and detection, the efficiency of problem locating is greatly improved. In scenarios such as traffic test and outfield test, when the transmitter is suspected to be abnormal, the transmitter does not need to be removed and retested. Whether the error vector magnitude is normal can be determined according to the EVM measurement method in this embodiment, and then whether there is an abnormality in the RF channel of the transmitter can be determined, which improves the efficiency of problem locating.

Figure 5:
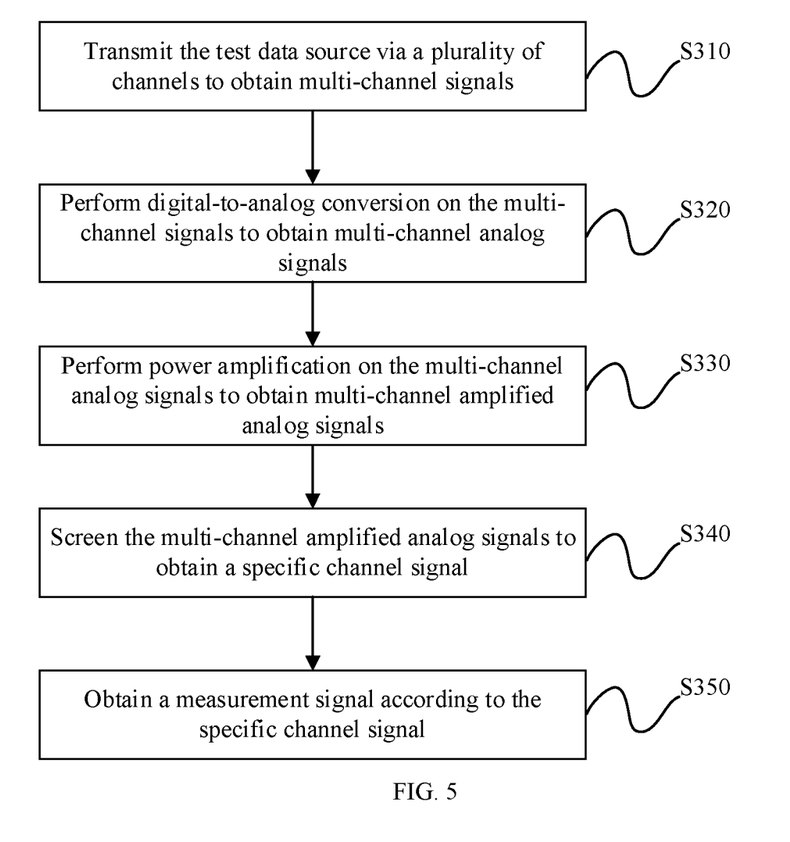
FIG. 5 is another flowchart of the EVM measurement method according to an embodiment of the present disclosure.

Referring to FIG. 5, FIG. 5 is another flowchart of the EVM measurement method according to an embodiment of the present disclosure. It can be understood that S300 in the embodiment shown in FIG. 1 includes, but not limited to, the following steps S310, S320, S330, S340, and S350.

At S310, the test data source is transmitted via a plurality of channels to obtain multi-channel signals.

It can be understood that a plurality of channels for data transmission are configured in the transmitter. After the transmitter generates a test data source according to the cell configuration parameter, the test data source may need to be divided into several parts and transmitted via the plurality of channels for subsequent processing.

It should be noted that the transmitter proposed in this embodiment may be an RRU or an AAU, which is selected according to actual use scenarios, as long as the selected unit can achieve the EVM measurement, and the selection of transmitter is not limited in the present disclosure.

At S320, digital-to-analog conversion is performed on the multi-channel signals to obtain multi-channel analog signals.

It can be understood that the generated test data source is a digital signal, so that a discrete digital quantity needs to be converted into a continuously changing analog quantity during transmission of the test data source, that is, the digital signal needs to be converted into the analog signal, such that the obtained analog signal of the test data source can be processed.

At S330, power amplification is performed on the multi-channel analog signals to obtain multi-channel amplified analog signals.

It can be understood that after the multi-channel analog signals are obtained, the power of the signals is not large enough to meet the load requirements of subsequent operations, so that power amplification needs to be performed on the multi-channel analog signals.

At S340, the multi-channel amplified analog signals are screened to obtain a specific channel signal.

It can be understood that after the multi-channel amplified analog signals are obtained, due to the fact that in an actual test for the multi-channel transmitter, only one signal in a single channel can be tested at a time, one channel needs to be selected from the plurality of channels and the corresponding amplified analog signals of the channel are screened for subsequent loopback and demodulation.

At S350, a measurement signal is obtained according to the specific channel signal.

It can be understood that after the specific channel signal is obtained through screening, the specific channel signal needs to be processed. To be specific, the specific channel signal is processed by a feedback coupling link to be converted into a digital signal that can be demodulated, that is, the measurement signal proposed in this embodiment.

Figure 6:
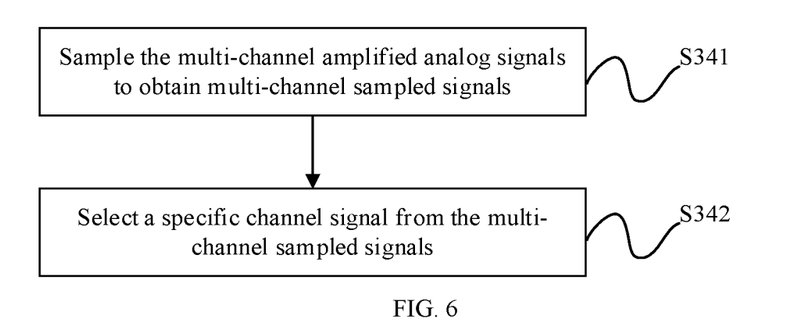
FIG. 6 is another flowchart of the EVM measurement method according to an embodiment of the present disclosure.

Referring to FIG. 6, FIG. 6 is another flowchart of the EVM measurement method according to an embodiment of the present disclosure. It can be understood that S340 in the embodiment shown in FIG. 5 includes, but not limited to, the following steps S341 and S342.

At S341, the multi-channel amplified analog signals are sampled to obtain multi-channel sampled signals.

It can be understood that after the multi-channel amplified analog signals are output, the multi-channel amplified analog signals need to be sampled for subsequent detection before the final demodulation of the signals and the calculation of the error vector magnitude.

It should be noted that the signals extracted in the sampling process is about 40 dB, which means that the extracted data accounts for about one in a hundred thousand of the total data. During normal data transmission from the transmitter, a very small amount of data is extracted for EVM measurement, ensuring that there is sufficient signal data for the transmitter to perform external service interaction.

At S342, a specific channel signal is selected from the multi-channel sampled signals.

It can be understood that when the amplified analog signal in each channel is sampled to obtain the multi-channel sampling signals, because the transmitter cannot perform EVM measurement on multiple channels at the same time, the transmitter only selects the sampled signal of one of the multiple channels for EVM measurement.

It should be noted that in the process of selecting a specific channel signal from the multi-channel sampled signals, a specific channel may be specified according to actual needs, and the sampled signal in the specified channel is used to complete the detection; or a channel may be randomly selected, and the sampled signal in the randomly selected channel is used to complete the detection, which is not limited in this embodiment.

Figure 7:
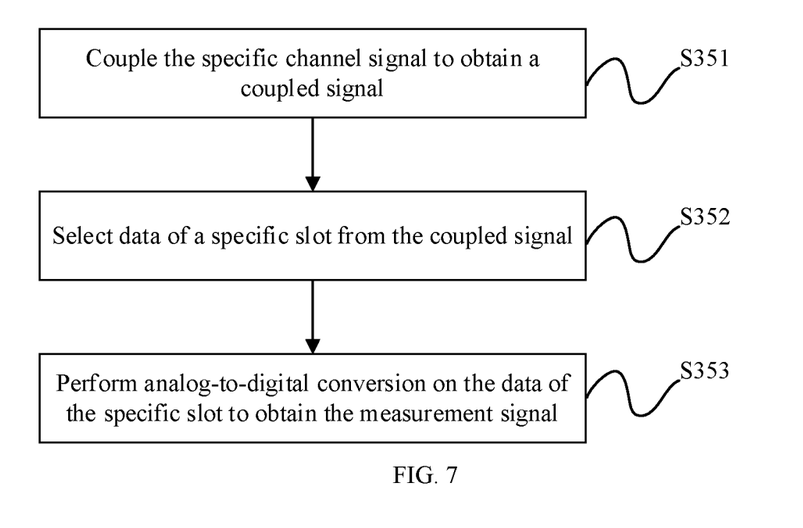
FIG. 7 is another flowchart of the EVM measurement method according to an embodiment of the present disclosure.

Referring to FIG. 7, FIG. 7 is another flowchart of the EVM measurement method according to an embodiment of the present disclosure. It can be understood that S350 in the embodiment shown in FIG. 5 includes, but not limited to, the following steps S351, S352 and S353.

At S351, the specific channel signal is coupled to obtain a coupled signal.

At S352, data of a specific slot is selected from the coupled signal.

At S353, analog-to-digital conversion is performed on the data of the specific slot to obtain a measurement signal.

It can be understood that after the specific channel signal is obtained by screening, the transmitter loops back the specific channel signal for demodulation. The transmitter first transmits the specific channel signal to a feedback coupling link to couple the specific channel signal, then a continuously changing analog quantity is converted into a discrete digital quantity via an analog-to-digital converter, that is, an analog signal is converted into a digital signal, and finally a measurement signal is obtained. The measurement signal is demodulated and calculated to obtain the RF indicators of the transmitter.

It should be noted that according to the definitions of various test models in 5G NR and LTE in 38.141 protocol and 36.141 protocol, different test model data contain data of a plurality of slots, that is, the coupled signal obtained after the test data source is processed by the above method contains data of the plurality of slots. In this embodiment, data of one specific slot is collected from the data of the plurality of slots in the coupled signal for demodulation, that is, data of the specific slot is selected from the coupled signal. For example, when the protocol specifies that the basic unit of demodulation is 1 slot, and a sent data stream has a total of 20 slots. Assuming that 1 slot is 0.5 milliseconds, data of a first slot will be extracted when a selected slot delay for extraction is 0 milliseconds; data of a tenth slot will be extracted when the selected slot delay for extraction is 5 milliseconds, and so on. Data of the specific slot may be slot data corresponding to a specific delay specified, or may be slot data randomly selected. In this embodiment, the measurement of error vector magnitude can be completed by selecting data of only one specific slot, which is not limited in this embodiment.

Figure 8:
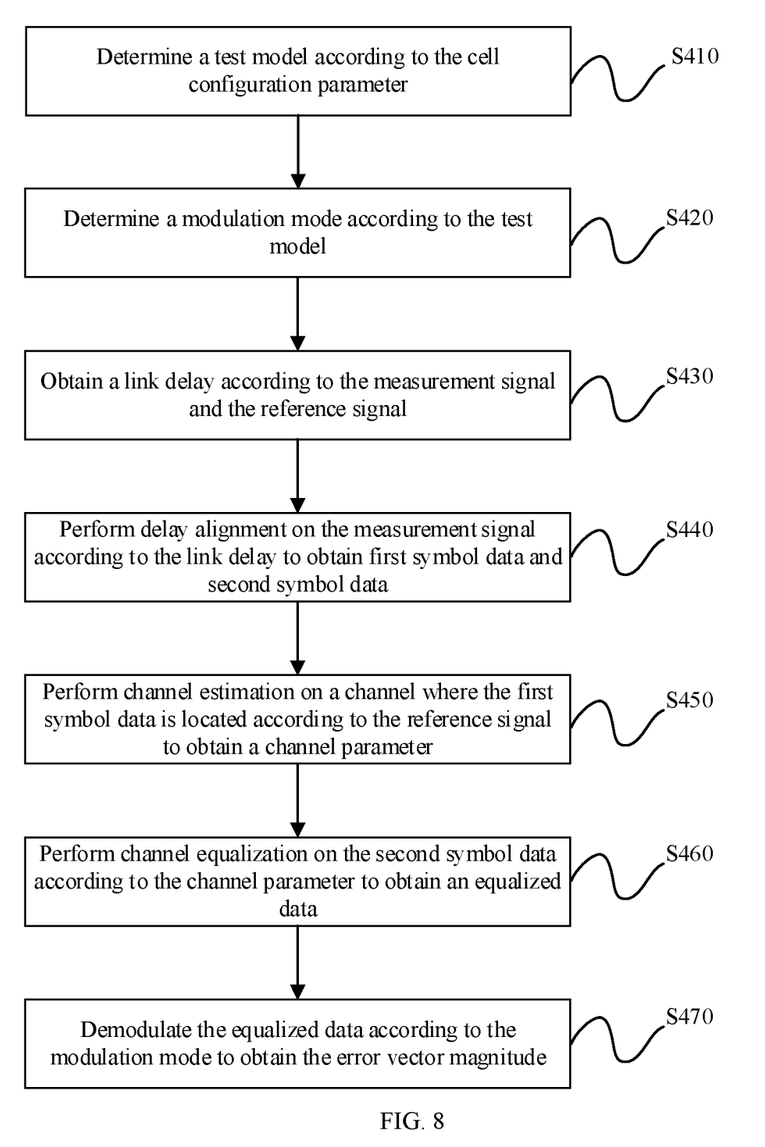
FIG. 8 is another flowchart of the EVM measurement method according to an embodiment of the present disclosure.

Referring to FIG. 8, FIG. 8 is another flowchart of the EVM measurement method according to an embodiment of the present disclosure. It can be understood that S400 in the embodiment shown in FIG. 4 includes, but not limited to, the following steps S410, S420, S430, S440, S450, S460, and S470.

At S410, a test model is determined according to the cell configuration parameter.

It can be understood that the 5G NR test model required by the test of the RF indicators of the AAU/RRU is specified in TS38.141 protocol 4.9.2 of 3GPP, and the LTE test model required by the test of the RF indicators is specified in TS36.141 protocol 6.1.1 of 3GPP. In this embodiment, test models corresponding to different signal systems are stored in the cell configuration parameter, such that the transmitter can determine the test model according to the cell configuration parameter.

At S420, a modulation mode is determined according to the test model.

It can be understood that the cell configuration parameter includes signal system, bandwidth, etc. In 3GPP-related protocols, various test models corresponding to different signal systems are specified, and each test model corresponds to a modulation mode and a number of resource scheduling blocks. After the transmitter determines a test model according to a cell configuration parameter, the transmitter generates a corresponding test data source. Therefore, during the demodulation process, it may also need to determine the corresponding modulation mode according to the test model, so as to demodulate the processed test data source and calculate the error vector magnitude.

At S430, a link delay is obtained according to the measurement signal and the reference signal.

It can be understood that a plurality of reference signals are preset in the transmitter, which correspond to the test models in the cell configuration parameter. In 3GPP protocols, specified reference signals are set for different test models, that is, each test model has a corresponding reference signal. The reference signal refers to a signal obtained after the test data source is subjected to the above processing in an ideal state. Compared with the measurement signal obtained by processing the test data source in an actual situation, the reference signal is a signal obtained through undistorted transmission, that is, only the magnitude and the time of appearance of the signal are different, and there is no change in the waveform.

It should be noted that the test data source will be affected in the process of digital-to-analog conversion, power amplification, coupling and other operations, so there will be a certain delay between the measurement signal and the reference signal when the measurement signal is obtained. Therefore, in this embodiment, the actually obtained measurement signal is compared with the pre-stored reference signal to obtain the link delay.

At S440, delay alignment is performed on the measurement signal according to the link delay to obtain first symbol data and second symbol data.

It can be understood that after the link delay is obtained, delay alignment is performed on the measurement signal to obtain the first symbol data and the second symbol data. The first symbol data refers to service data corresponding to the link delay in the data of the specific slot, while the second symbol data refers to other service data except the first symbol data in data of the specific slot. Subsequent processing is performed after the first symbol data and the second symbol data are obtained.

At S450, channel estimation is performed on a channel where the first symbol data is located according to the reference signal to obtain a channel parameter.

It can be understood that after delay alignment is performed, channel estimation is performed on the channel where the first symbol data is located according to the reference signal. Channel estimation is a key technology for achieving wireless communication. By obtaining detailed channel parameter through channel estimation, the transmitted signal can be correctly demodulated at a receiving end.

At S460, channel equalization is performed on the second symbol data according to the channel parameter to obtain an equalized data.

It can be understood that after the channel parameter is obtained through channel estimation, channel equalization is performed on the other service symbol, i.e., the second symbol data according to the channel parameter. Channel equalization technology refers to an anti-fading measure taken to improve the transmission performance of communication systems in fading channels, which is mainly used to eliminate or reduce inter-symbol interference caused by multi-path delay in broadband communication. After channel equalization is performed on the second symbol data according to the channel parameter, the equalized data is obtained.

At S470, the equalized data is demodulated according to the modulation mode to obtain the error vector magnitude.

It can be understood that the transmitter can determine the test model used in this measurement according to the cell configuration parameter, generate the corresponding test data source, and determine the modulation mode corresponding to the test model. After the test data source is processed and the equalized data is obtained, the equalized data is demodulated and calculated to obtain the error vector magnitude. The test data source is generated and processed by the transmitter itself, and demodulation and calculation are performed on the test data source to finally obtain the error vector magnitude, so as to determine whether the RF indicators of the transmitter are abnormal and locate the problem. The transmitter can detect the RF indicators by itself, without removing and returning the transmitter to the factory for inspection, which greatly reduces the test costs.

Figure 9:
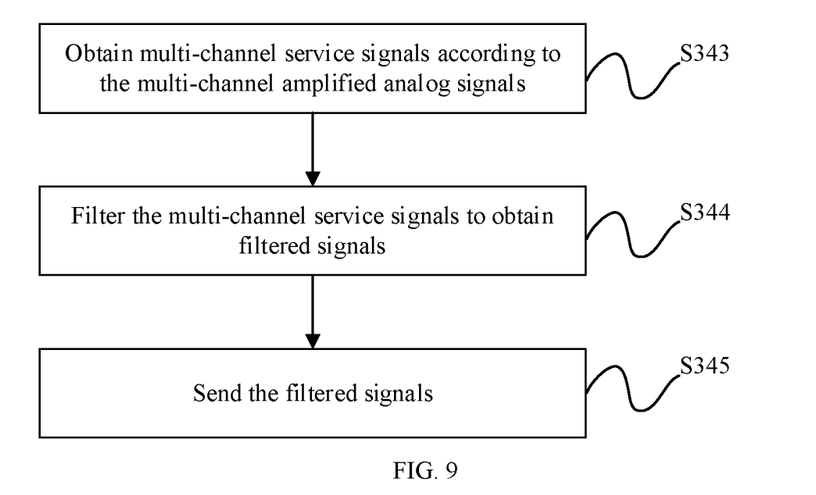
FIG. 9 is another flowchart of the EVM measurement method according to an embodiment of the present disclosure.

Referring to FIG. 9, FIG. 9 is another flowchart of the EVM measurement method according to an embodiment of the present disclosure. It can be understood that S340 in the embodiment shown in FIG. 5 further includes, but not limited to, the following steps S343, S344 and S345.

At S343, multi-channel service signals are obtained according to the multi-channel amplified analog signals.

At S344, the multi-channel service signals are filtered to obtain filtered signals.

At S345, the filtered signals are sent.

It can be understood that in S341, after the multi-channel amplified analog signals are sampled to obtain multi-channel sampled signals, multi-channel service signals are obtained according to the multi-channel amplified analog signals. The multi-channel service signals refer to a set of signals except the multi-channel sampled signals after sampling of the multi-channel amplified analog signals is completed. During the sampling process, the extracted signal is about 40 dB, which means that a ratio of multi-channel service signals to multi-channel sampled signals is about 100000:1. After the multi-channel service signals are obtained, the multi-channel service signals are filtered to obtain filtered signals, i.e., the signal data required for service interaction. Finally, the filtered signals are sent out for service interaction. For example, in this embodiment, an antenna is used for transmitting the filtered signals. In the present disclosure, other signal transmission apparatuses may also be used for signal transmission, which is not limited in the present disclosure.

Figure 10:
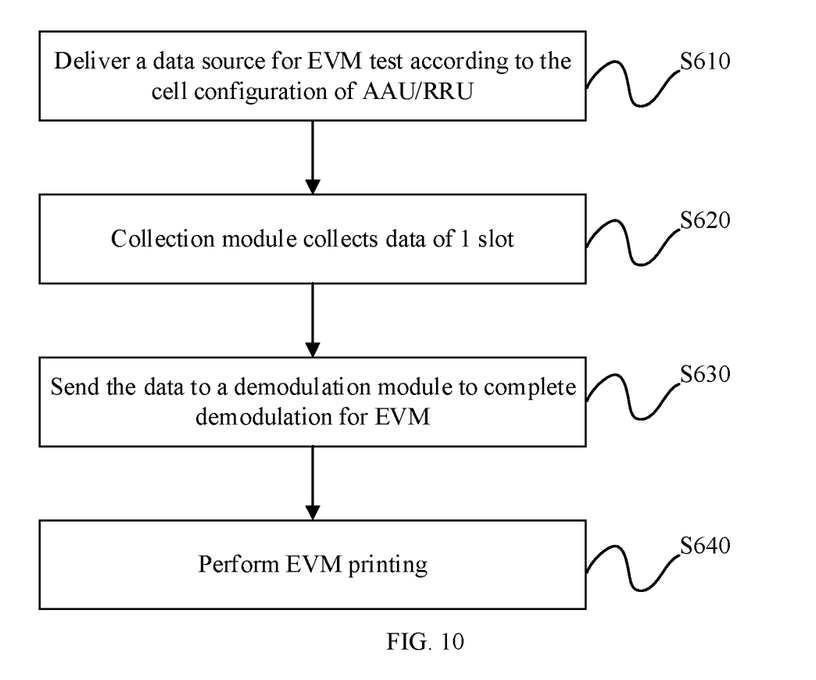
FIG. 10 is another flowchart of the EVM measurement method according to an embodiment of the present disclosure.

Referring to FIG. 10, FIG. 10 is another flowchart of the EVM measurement method according to an embodiment of the present disclosure. It can be understood that the embodiment shown in FIG. 10 includes, but not limited to, the following steps S610, S620, S630 and S640.

At S610, a data source for EVM test is delivered according to cell configuration of the AAU/RRU.

At S620, a collection module collects data of 1 slot.

At S630, the data is sent to a demodulation module to complete demodulation for EVM.

At S640, EVM printing is performed.

It can be understood that when S610 is executed, the AAU/RRU generates and delivers the test data source for EVM measurement after obtaining the cell configuration from the control terminal device. The cell configuration includes information such as signal system, bandwidth, etc. According to a generation mode of the test data source corresponding to each test model defined in 3GPP-related protocols, the test data source is dynamically generated and sent. It should be noted that the test data sources corresponding to different test models can be dynamically switched, thus achieving a goal of test data source switching according to actual needs.

After the test data source is delivered, S620 is executed, and the collection module collects data of 1 slot. According to the definitions of various test models for NR and LTE in 38.141 protocol and 36.141 protocol of 3GPP, different test data sources contain data of a plurality of slots. In this embodiment, data of a specified slot is collected for demodulation. Before the slot data is collected, a RF switch selection component for the channel to be tested is switched to the coupling channel, the signal is looped back to the coupling channel, and data of 1 slot is collected in the channel for demodulation to obtain EVM. After the slot data is collected, S630 is executed to send the data to the demodulation module to complete demodulation for EVM. This step includes delay alignment, channel estimation, channel equalization, and EVM calculation. In the delay alignment, the slot data collected in S620 and the reference signal pre-stored locally are used to calculate the link delay and perform delay alignment, and the corresponding symbol data is extracted after the delay alignment is performed. After the delay alignment is completed, the loopback signal is extracted and combined with the reference signal for channel estimation to obtain the channel parameter. Then, channel equalization is performed on other service symbol data according to the channel parameter, and demodulation for EVM is performed according to the modulation mode corresponding to the test model to obtain a current error vector magnitude. Finally, in S640, EVM printing is performed. In this step, the EVM obtained through demodulation and calculation is sent to the control terminal device for presentation. In this embodiment, EVM printing supports printing at a slot level, a symbol level and an RB level, and query information according to actual configuration can be displayed. Compared with the measurement methods in some cases, in this embodiment, there is no need to build a complex test environment, and the EVM measurement of the RF channel of the AAU/RRU can be completed by connecting the AAU/RRU to the control terminal device. The AAU/RRU can generate and deliver the test data source by itself, without the need for the BBU to generate the test data source and deliver the test data source to the AAU/RRU through optical fibers. In addition, the AAU/RRU can loop back the test data source through the coupling channel for collection and demodulation to obtain EVM, thereby eliminating the need for the attenuator and the spectrometer connected to the attenuator for EVM measurement. Meanwhile, according to the method of this embodiment, whether the EVM is normal can be detected without removing and returning the AAU/RRU to the factory for inspection, thus improving the efficiency of problem locating.

Figure 11:
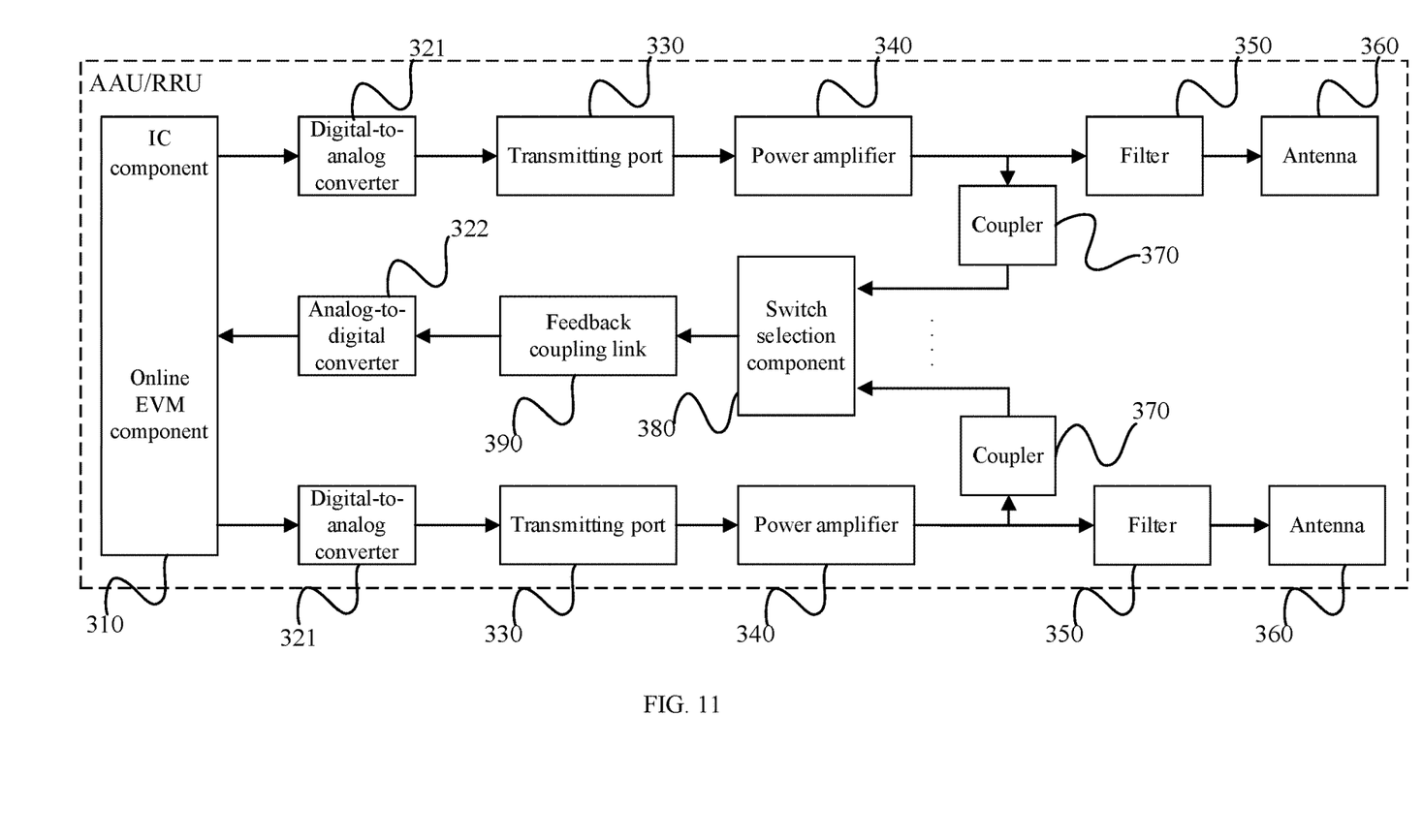
FIG. 11 is a hardware block diagram according to another embodiment of the present disclosure.

Referring to FIG. 11, FIG. 11 is a hardware block diagram according to an embodiment of the present disclosure. It can be understood that in this embodiment, modules such as an Integrated Circuit (IC) component, a digital-to-analog converter 321, an analog-to-digital converter 322, a transmitting port 330, a power amplifier 340, a filter 350, an antenna 360, a coupler 370, a switch selection component 380, a feedback coupling link 390, etc., are included. There are multiple channels for data transmission in an AAU/RRU, and each channel is correspondingly provided with modules such as a transmitting port 330, a power amplifier 340, an antenna 360, a coupler 370, etc. The IC component is provided with an online EVM component 310. The cell configuration parameter includes a signal system and a corresponding test model. After receiving the cell configuration parameter from the control terminal device, the online EVM component 310 generates, according to the cell configuration parameter, and delivers corresponding test data source. The corresponding test data source passes through the digital-to-analog converter 321, and then is transmitted through a RF downlink of the transmitting port 330, to pass through the power amplifier 340 and the filter 350 for processing, the processed data is sent via the antenna 360 for service interaction. The coupler 370 is provided between the power amplifier 340 and the filter 350. The signals coupled from multiple channels are selected by the switch selection component 380, and only a portion of the signal data in one channel passes through the feedback coupling link 390, which is then converted by the analog-to-digital converter 322 and returned to the IC component. In the online EVM module 310, a reference signal is pre-stored. The reference signal refers to a measurement signal obtained by processing the test data source in an ideal state. Compared with the measurement signal, the reference signal is a signal obtained through undistorted transmission, that is, only the magnitude and the time of appearance of the signal are different, and there is no change in the waveform. Reference signals corresponding to different test models are pre-stored in the online EVM module 310. The online EVM component 310 collects data of a specified slot and obtains the measurement signal, then performs demodulation according to the measurement signal and the reference signal to finally obtain the error vector magnitude.

It should be noted that a hardware operation method in this embodiment is used in application scenarios such as test of downlink RF indicators of the AAU/RRU, a test station of RF indicators of an AAU/RRU production line, and an automation test of RF indicators of the AAU/RRU, which can complete EVM measurement without the BBU and spectrometer, thereby reducing measurement cost and improving the efficiency of problem locating. At the same time, when a peak traffic cannot be reached, the method in this embodiment can achieve signal decoupling and problem locating, to determine whether the downlink RF indicators of the AAU/RRU are normal, without removing the AAU/RRU from the station for retest.

Figure 12:
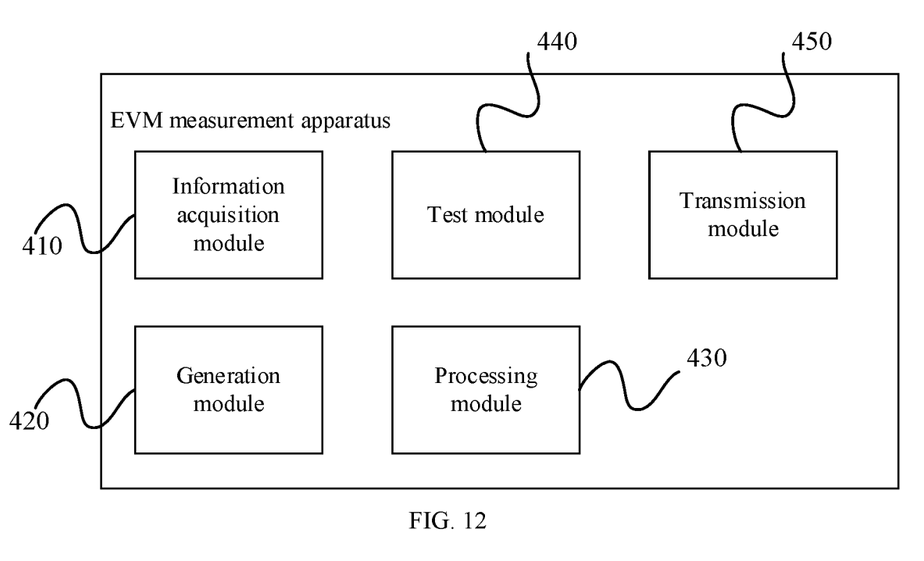
FIG. 12 is a module block diagram of an EVM measurement apparatus according to an embodiment of the present disclosure.

As shown in FIG. 12, another embodiment of the present disclosure provides an EVM measurement apparatus. It can be understood that the EVM measurement apparatus proposed in this embodiment includes an information acquisition module 410, a generation module 420, a processing module 430, a test module 440, and a transmission module 450. The information acquisition module 410 is configured to acquire a cell configuration parameter from a control terminal device; the generation module 420 is configured to generate a test data source according to the cell configuration parameter; the processing module 430 is configured to obtain a measurement signal according to the test data source; the test module 440 is configured to determine an error vector magnitude according to the measurement signal and a preset reference signal; and the transmission module 450 is configured to transmit the error vector magnitude to the control terminal device, such that the control terminal device performs problem locating on the transmitter according to the error vector magnitude. By acquiring the cell configuration parameter from the control terminal device, corresponding test data source is generated, and the measurement signal is obtained according to the test data source. At the same time, a reference signal is pre-stored in the AAU/RRU, the error vector magnitude is determined according to the measurement signal and the preset reference signal. Finally, the error vector magnitude is sent to the control terminal device, such that the control terminal device performs problem locating on the transmitter according to the error vector magnitude. This apparatus can detect the RF indicators of the AAU/RRU by itself, so as to judge whether there are any abnormalities in the RF channels of the AAU/RRU, and then determine whether the transmitter needs to be repaired according to a judgment result, without removing and returning the transmitter to the factory for testing of the RF indicators, thus saving a lot of costs.

Another embodiment of the present disclosure provides a transmitter, which includes a memory, a processor, a program stored in the memory and capable of running on the processor, and a data bus for implementing connection and communication between the processor and the memory. The transmitter is capable of executing the EVM measurement method proposed in the embodiment of the present disclosure.

In addition, another embodiment of the present disclosure provides a base station, which includes a memory, a processor, and a computer program stored in the memory and capable of running on the processor.

The processor and the memory may be connected through a data bus or other means.

As a non-transient computer readable storage medium, the memory may be used to store non-transient software programs and non-transient computer executable programs. In addition, the memory may include a high-speed random access memory, as well as a non-transient memory, such as at least one disk storage device, flash memory device, or other non-transient solid-state storage devices. In some embodiments, the memory may include memories remotely located with respect to the processor, which may be connected to the processor through a network. Examples of the network include, but not limited to, the Internet, an intranet, a local area network, a mobile communication network, and combinations thereof.

Non-transient software programs and instructions required to implement the EVM measurement method in the above embodiment are stored in a memory which, when executed by the processor, causes the processor to implement the EVM measurement method in the above embodiment, for example, implement the above-described method steps S100 to S500 in FIG. 4, the above-described method steps S310 to S350 in FIG. 5, the above-described method steps S341 to S342 in FIG. 6, the above-described method steps S351 to S353 in FIG. 7, the above-described method steps S410 to S470 in FIG. 8, the above-described method steps S343 to S345 in FIG. 9, or the above-described method steps S610 to S640 in FIG. 10.

The apparatus embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

In addition, an embodiment of the present disclosure provides a computer-readable storage medium, storing a computer-executable instruction which, when executed by a processor or controller, for example, by a processor in the base station described above, causes the processor to implement the EVM measurement method, for example, implement the above-described method steps S100 to S500 in FIG. 4, the above-described method steps S310 to S350 in FIG. 5, the above-described method steps S341 to S342 in FIG. 6, the above-described method steps S351 to S353 in FIG. 7, the above-described method steps S410 to S470 in FIG. 8, the above-described method steps S343 to S345 in FIG. 9, or the above-described method steps S610 to S640 in FIG. 10.

In an embodiment of the present disclosure, a transmitter acquires a cell configuration parameter from a control terminal device and generates a test data source according to the cell configuration parameter, then obtains a measurement signal according to the test data source, further then determines an error vector magnitude according to the measurement signal and a preset reference signal, and finally sends the error vector magnitude to the control terminal device, such that the control terminal device performs problem locating on the transmitter according to the error vector magnitude. According to the scheme provided by the embodiments of the present disclosure, the corresponding test data source is generated by acquiring the cell configuration parameter from the control terminal device, and the measurement signal is obtained according to the test data source. At the same time, a reference signal is pre-stored in the transmitter, and the error vector magnitude is determined according to the measurement signal and the preset reference signal. Finally, the error vector magnitude is sent to the control terminal device, such that the control terminal device performs problem locating on the transmitter according to the error vector magnitude. This method can detect the RF indicators of the transmitter, so as to judge whether there are any abnormalities in the RF channel of the AAU/RRU, and then determine whether the transmitter needs to be repaired according to a judgment result, without removing and returning the transmitter to the factory for testing of the RF indicators, thus saving a lot of costs.

Those having ordinary skills in the art can understand that all or some of the steps in the methods disclosed above and the functional modules/units in the system and the devices may be implemented as software, firmware, hardware, and appropriate combinations thereof.

In hardware implementation, the division between functional modules/units mentioned in the above description may not necessarily correspond to the division of physical components. For example, a physical component may have multiple functions, or a function or step may be executed in collaboration with several physical components. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storages, a cassette, a magnetic tape, a magnetic disk storage or other magnetic storage devices, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and may include any information delivery medium.

Although some implementations of the present disclosure have been described above with reference to the accompanying drawings, the scope defined by the claims of the present application is not limited. Those having ordinary skills in the art can make various modifications, equivalent replacements, and improvements without departing from the scope and essence of the present disclosure. Such modifications, equivalent replacements, and improvements fall within the scope defined by the claims of the present disclosure.

What is claimed is:

1. An Error Vector Magnitude (EVM) measurement method, applied to a transmitter, comprising:
    acquiring a cell configuration parameter from a control terminal device;
    generating a test data source according to the cell configuration parameter;
    obtaining a measurement signal according to the test data source;
    determining an error vector magnitude according to the measurement signal and a preset reference signal; and
    sending the error vector magnitude to the control terminal device, such that wherein the control terminal device determines whether there is any abnormality in RF indicators of the transmitter according to the error vector magnitude;
    wherein the transmitter is provided with a plurality of channels for data transmission, and obtaining the measurement signal according to the test data source comprises:
    transmitting the test data source via the plurality of channels to obtain multi-channel signals;
    performing digital-to-analog conversion on the multi-channel signals to obtain multi-channel analog signals;
    performing power amplification on the multi-channel analog signals to obtain multi-channel amplified analog signals;
    sampling the multi-channel amplified analog signals to obtain multi-channel sampled signals, wherein the multi-channel sampled signals are a set of sampled signals from each of the plurality of channels;
    selecting the specific channel signal from the multi-channel sampled signals; and
    obtaining the measurement signal according to the specific channel signal.

2. The EVM measurement method of claim 1, wherein obtaining a measurement signal according to the specific channel signal comprises:
    coupling the specific channel signal to obtain a coupled signal, wherein the coupled signal contains data of a plurality of slots;
    selecting data of a specific slot of the plurality of slots from the coupled signal; and
    performing analog-to-digital conversion on the data of the specific slot to obtain the measurement signal.

3. The EVM measurement method of claim 2, wherein determining an error vector magnitude according to the measurement signal and a preset reference signal comprises:
    determining a test model according to the cell configuration parameter;
    determining a modulation mode according to the test model;
    obtaining a link delay according to the measurement signal and the reference signal;
    performing delay alignment on the measurement signal according to the link delay to obtain first symbol data and second symbol data, wherein the first symbol data is service data corresponding to the link delay in the data of the specific slot, and the second symbol data is other service data except the service data corresponding to the link delay in the data of the specific slot;
    performing channel estimation on a channel where the first symbol data is located according to the reference signal to obtain a channel parameter;
    performing channel equalization on the second symbol data according to the channel parameter to obtain an equalized data; and
    demodulating the equalized data according to the modulation mode to obtain the error vector magnitude.

4. The EVM measurement method of claim 1, after sampling the multi-channel amplified analog signals to obtain multi-channel sampled signals, further comprising:
    obtaining multi-channel service signals according to the multi-channel amplified analog signals;
    filtering the multi-channel service signals to obtain filtered signals; and
    sending the filtered signals.

5. An Error Vector Magnitude (EVM) measurement apparatus, comprising:
    an information acquisition module, configured to acquire a cell configuration parameter from a control terminal device;
    a generation module, configured to generate a test data source according to the cell configuration parameter;
    a processing module, configured to obtain a measurement signal according to the test data source;
    a test module, configured to determine an error vector magnitude according to the measurement signal and a preset reference signal; and
    a transmission module, configured to transmit the error vector magnitude to the control terminal device, wherein the control terminal device determines whether there is any abnormality in RF indicators of a transmitter according to the error vector magnitude;

wherein the transmitter is provided with a plurality of channels for data transmission, and obtaining the measurement signal according to the test data source comprises:

transmitting the test data source via the plurality of channels to obtain multi-channel signals;

performing digital-to-analog conversion on the multi-channel signals to obtain multi-channel analog signals;

performing power amplification on the multi-channel analog signals to obtain multi-channel amplified analog signals;

sampling the multi-channel amplified analog signals to obtain multi-channel sampled signals, wherein the multi-channel sampled signals are a set of sampled signals from each of the plurality of channels;

selecting the specific channel signal from the multi-channel sampled signals; and obtaining the measurement signal according to the specific channel signal.

6. A transmitter, comprising a memory, a processor, a program stored in the memory and capable of running on the processor, and a data bus for implementing connection and communication between the processor and the memory, wherein the program, when executed by the processor, causes the processor to carry out an Error Vector Magnitude (EVM) measurement method, applied to a transmitter, comprising:

acquiring a cell configuration parameter from a control terminal device;

generating a test data source according to the cell configuration parameter;

obtaining a measurement signal according to the test data source;

determining an error vector magnitude according to the measurement signal and a preset reference signal; and sending the error vector magnitude to the control terminal device, wherein the control terminal device determines whether there is any abnormality in RF indicators of the transmitter according to the error vector magnitude;

wherein the transmitter is provided with a plurality of channels for data transmission, and obtaining the measurement signal according to the test data source comprises:

transmitting the test data source via the plurality of channels to obtain multi-channel signals;

performing digital-to-analog conversion on the multi-channel signals to obtain multi-channel analog signals;

performing power amplification on the multi-channel analog signals to obtain multi-channel amplified analog signals;

sampling the multi-channel amplified analog signals to obtain multi-channel sampled signals, wherein the multi-channel sampled signals are a set of sampled signals from each of the plurality of channels;

selecting the specific channel signal from the multi-channel sampled signals; and obtaining the measurement signal according to the specific channel signal.

7. A base station, comprising a memory, a processor, and a computer program stored in the memory and capable of running on the processor, wherein the computer program, when executed by the processor, causes the processor to carry out the EVM measurement method of claim 1.

8. A non-transitory computer-readable storage medium, storing a computer-executable program which, when executed by a computer, causes the computer to carry out the EVM measurement method of claim 1.

* * * * *